United States Patent
Yang et al.

(10) Patent No.: US 12,498,883 B2
(45) Date of Patent: Dec. 16, 2025

(54) NETWORK DEVICE INTERMEDIARY FOR MEMORY ACCESS REQUESTS

(71) Applicant: SK Hynix NAND Product Solutions Corp., Rancho Cordova, CA (US)

(72) Inventors: Ziye Yang, Shanghai (CN); Shaopeng He, Shanghai (CN); Changpeng Liu, Shanghai (CN); Xiaodong Liu, Shanghai (CN)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 805 days.

(21) Appl. No.: 17/112,235

(22) Filed: Dec. 4, 2020

(65) Prior Publication Data

US 2021/0089236 A1    Mar. 25, 2021

(51) Int. Cl.
G06F 3/06    (2006.01)

(52) U.S. Cl.
CPC .......... *G06F 3/0659* (2013.01); *G06F 3/0622* (2013.01); *G06F 3/067* (2013.01)

(58) Field of Classification Search
None
See application file for complete search history.

(56) References Cited

U.S. PATENT DOCUMENTS 7,830,793 B2 * 11/2010 Gai .................. H04L 47/33
                                              370/233
8,688,904 B1 * 4/2014 Ari .................. G06F 3/068
                                              711/111

(Continued)

FOREIGN PATENT DOCUMENTS

KR    20130101504 A    9/2013
KR    20150120027 A    10/2015

OTHER PUBLICATIONS

Stefan Geissler et al., The Power of Composition: Abstracting a Multi-Device SDN Data Path Through a Single API, IEEE Transactions on Network and Service Management, vol. 17, No. 2, Jun. 2020. (Year: 2020).*

(Continued)

*Primary Examiner* — Arpan P. Savla
*Assistant Examiner* — Edmund H Kwong
(74) *Attorney, Agent, or Firm* — Haley Guiliano LLP

(57) ABSTRACT

Examples described herein relate to receiving memory access requests in a first number of connections from one or more front-end clients destined to a storage system and consolidating the memory access requests to a second number of connections between a network device and the storage system, wherein the second number is less than the first number. In some examples, consolidating the memory access requests includes combining read commands with other read commands destined to the storage system among connections of the first number of connections and combining write commands with other write commands destined to a same storage system among connections of the first number of connections. In some examples, consolidating the memory access requests includes performing protocol conversion to a format accepted by the storage system. In some examples, read or write commands are identified based on content of a header of a received packet, wherein the received packet includes a read or write command.

20 Claims, 10 Drawing Sheets

(56) References Cited

U.S. PATENT DOCUMENTS

| | | | |
|---|---|---|---|
| 10,298,683 B2* | 5/2019 | Litvinsky | G06F 12/128 |
| 10,810,157 B1* | 10/2020 | Paterra | G06F 3/067 |
| 10,963,189 B1* | 3/2021 | Neelakantam | G06F 3/0616 |
| 2018/0300846 A1* | 10/2018 | Ray | G06T 1/60 |
| 2018/0329841 A1 | 11/2018 | Maeda | |
| 2019/0384580 A1* | 12/2019 | Martini | H04L 41/082 |
| 2020/0097212 A1* | 3/2020 | Lakshman | G06F 3/0656 |
| 2020/0104691 A1 | 4/2020 | Bai et al. | |
| 2020/0134308 A1* | 4/2020 | Javadi | H04L 51/212 |
| 2020/0174697 A1* | 6/2020 | Brennan | G06F 3/0677 |
| 2020/0313999 A1* | 10/2020 | Lee | H04L 43/0847 |
| 2020/0314011 A1* | 10/2020 | Deval | H04L 45/74591 |
| 2020/0320004 A1 | 10/2020 | Mestan | |
| 2021/0089236 A1 | 3/2021 | Yang et al. | |
| 2021/0103536 A1* | 4/2021 | Galles | G06F 9/30101 |

OTHER PUBLICATIONS

International Search Report and Written Opinion for PCT Patent Application No. PCT/US21/51799, Mailed Ja. 19, 2022, 12 pages.
"Architecture overview", Citrix | Product documentation, https://docs.citrix.com/en-us/storage-zones-controller/5-0/architecture-overview.html, Dec. 9, 2019, 7 pages.
"iSCSI SAN Configuration Guide", Update 2 and later for ESX Server 3.5, ESX Server 3i version 3.5, VirtualCenter 2.5, VMWARE, Feb. 9, 2009, 132 pages.
"Storage backgrounders: iSCSI and Fibre Channel", Computer Weekly.com, https://www.computerweekly.com/feature/Storage-backgrounders-iSCSI-and-Fibre-Channel, Jul. 17, 2017, 4 pages.
Mombrea, Matthew, "What to expect from iSCSI Link Aggregation on your network More available bandwidth, not higher transfer rates from LACP/LAG", Computerworld, https://www.computerworld.com/article/2860468/what-to-expect-from-iscsi-link-aggregation-on-your-network.html, Dec. 17, 2014, 2 pages.

* cited by examiner

NETWORK DEVICE INTERMEDIARY FOR MEMORY ACCESS REQUESTS

Some applications deployed in a data center receive massive numbers of requests (connections) from different users under during events such as Black Friday online shopping event in U.S., Alibaba's single day event (November 11), and JD.com's 518 event (May 18). In these conditions, there is enormous pressure on backend (cloud) storage systems due to the communications over connections with front end users. In some cases, the storage system is not able to handle the connections and access to the storage system is degraded.

DETAILED DESCRIPTION

Figure 1:
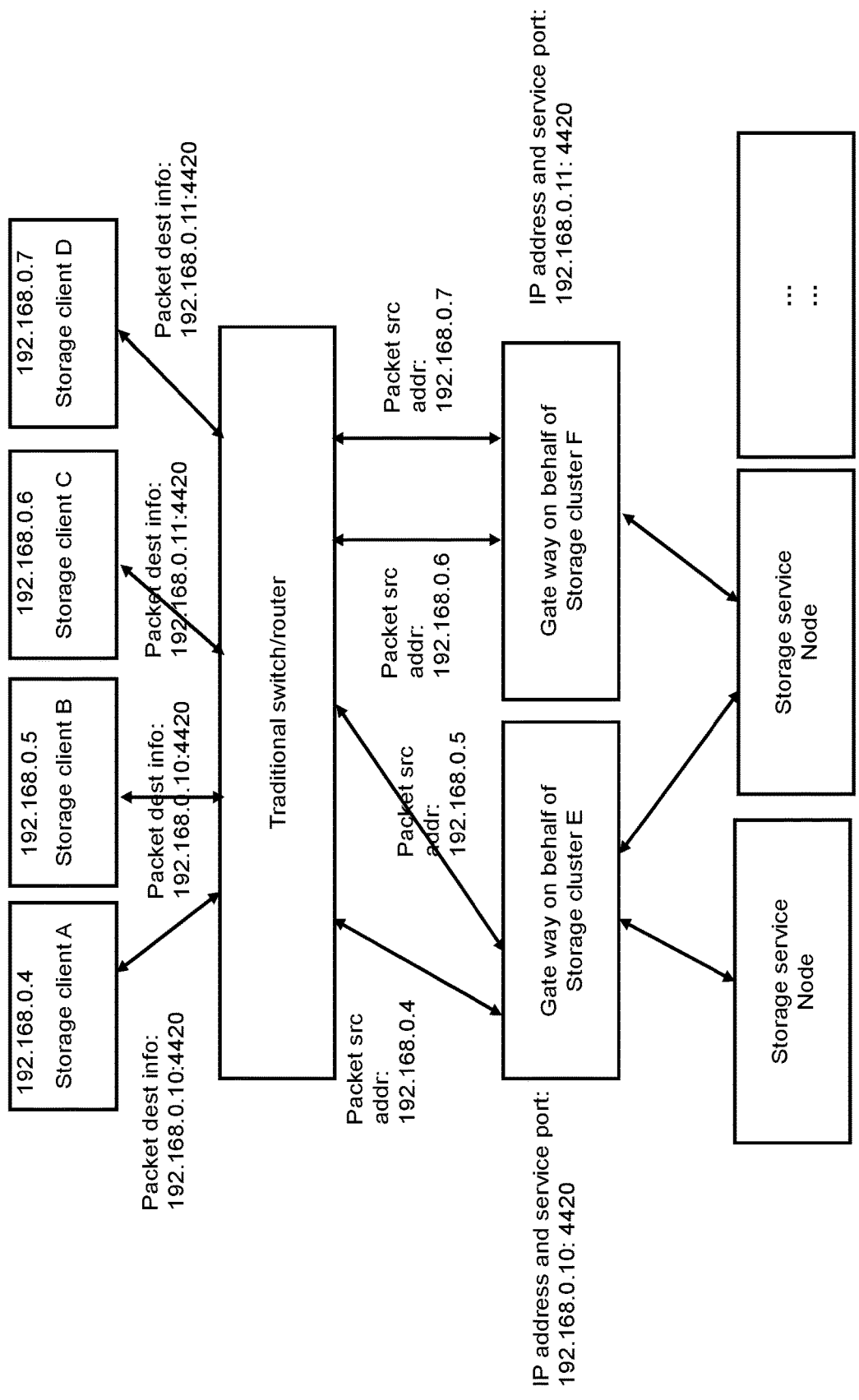
FIG. 1 depicts a system.

FIG. 1 shows an example system. In this example, there are 4 storage clients (A, B, C, and D) that request use of storage services from storage clusters E and F. For example, storage clients A and B communicate with storage cluster E whereas storage clients C and D communicate with storage cluster F. Thus, services deployed in gateways for storage clusters E and F can maintain two connections with storage clients. A path to a backend storage system can include user's requests to an application, application issued requests to a storage engine managed by the applications (e.g., database), or storage engine issued requests (e.g., transformed to connections) to the remote gate way nodes. A storage gateway can include a network appliance or server which resides at the customer premises and translates cloud storage application program interfaces (APIs) such as SOAP or REST to block-based storage protocols such as Internet Small Computer Systems Interface (iSCSI) or FibreChannel or file-based interfaces such as Network File System (NFS) or Server Message Block (SMB). A storage cluster can include two or more storage servers working together to increase performance, capacity, or reliability.

Under high packet traffic, a gateway to a storage service node can discard received requests or cache the requests but not send the requests to the backend storage systems in order to protect the backend storage systems from being overwhelmed. A gateway service utilized by a storage service has a maximum number of connections and if the requests exceed the limitation of the gateway service, a denial of service (DoS) occurs, which is an undesirable result. For online shopping applications, the users may click the submission button again and the request can be retransmitted. If the application service discards user's requests under pressure, the customer experience may be negative as the website or application interaction is too slow.

Some solutions deploy more servers with more network adapters and leverage load balancing algorithms among gateway nodes of the storage clusters. Adding storage servers can support additional connections but have additional cost for the cloud infrastructure.

Various embodiments provide a Protocol Independent Switch Architecture (PISA) to deploy a storage gateway in a programmable pipeline of a network device to reduce the pressure on backend storage services. Various embodiments provide a network device configured to reduce a number of connections to a backend storage system. A storage connection can include a network connection between one process on a host and a destination process on another host. During the lifetime of the connection, there can be bi-directional interactions between the two processes and the two processes can utilize predefined storage protocols. Any protocol can be used for a connection including, but not limited to, TCP. Various embodiments configure a network device to perform I/O aggregation, batch handling, I/O merging and negotiate with the backend storage systems in order to behave as the storage service to the client applications and behave as the client to the storage systems, and perform conversion of storage commands from the front-end to the storage commands. Various embodiments can reduce the network connection related cost to the backend storage systems, which can be used to reduce the pressure to the backend storage systems, and improve the performance to the front-end applications. Various embodiments are transparent to the front end hosts and can improve performance of front-end applications, improving user experience if high number of transactions are received at a backend storage system.

A front-end application may negotiate with the storage service in the network device in order to not add pressure to the backend storage systems and the storage service in the network device can negotiate with the backend storage systems in order to aggregate the requests from front-end applications to reduce the pressure to the storage systems such as reducing connection numbers. To the front-end applications, the storage service in the network device acts as a storage server and the storage service in the network device acts as a client to the backend storage clusters. Thus, in some embodiments, the front-end applications do not communicate directly with backend storage systems and the backend storage system do not communicate directly with the applications since the backend storage systems communicate with the network device using an IP address of the network device.

For cloud service providers (CSPs) which have some special events (e.g., Alibaba, JD.com), these techniques can reduce the pressure of their cloud storage system and transform the pressure to the switches or routers.

Figure 2:
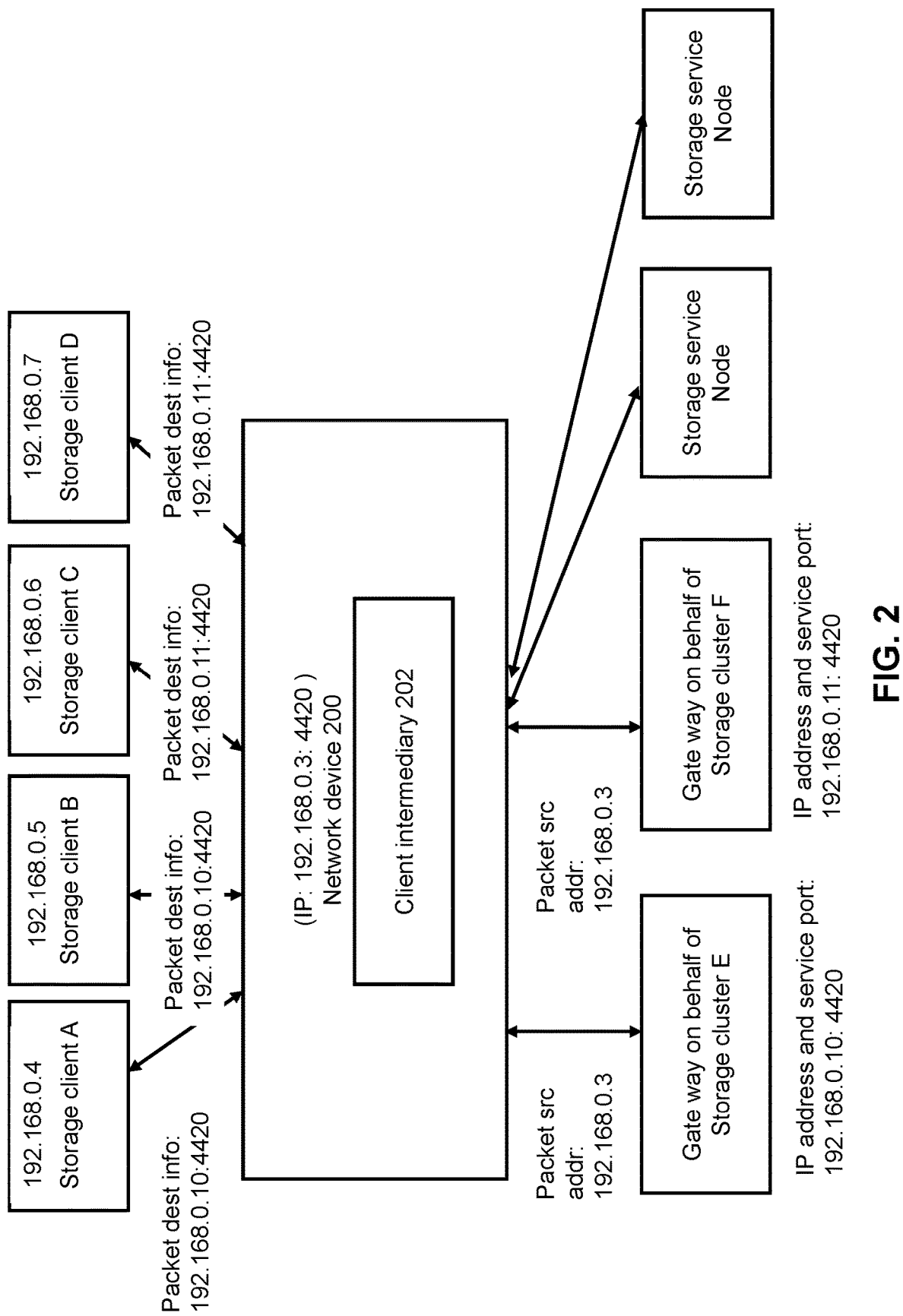
FIG. 2 depicts a system.

FIG. 2 depicts a system. In some embodiments, network device 200 can consolidate connections between storage clients A, B, C, and D and utilize fewer connections with gateways for backend storage systems so that a gateway utilizes fewer connections with storage clients. A storage client can include a mobile device, smart phone, or personal computer executing an application (e.g., database, purchases of goods, media streaming) and issues a request to a backend storage cluster associated with an IP address.

In some examples, network device 200 can present itself as a front end client to a gateway of a storage cluster and reduce a number of connections with a storage cluster. In some examples, network device 200 can utilize a front-end connection (from a front-end client to network device 200) and a backend connection (from network device 200 to a gateway for a storage cluster). In this example, network device 200 can receive packets with a destination IP addresses of 192.168.0.10 and 192.168.0.11 with destination port of 4420, which correspond to gateways for respective storage clusters E and F. In this example, network device 200 can present itself as a storage client with a source IP address of 192.168.0.3 to gate ways for storage clusters E and F instead of providing any source IP address of any storage clients A-D. In this example, storage clients A, B, C, and D are communicatively coupled to network device 200 using four connections and network device 200 is communicatively coupled to a gateway for storage cluster E using one connection and to a gateway for storage cluster F using one connection. In this example, compared to the configuration of FIG. 1, gateways for storage clusters E and F maintain one connection each instead of two connections. Network device 200 can be implemented as one or more of: an endpoint transmitter or receiver, network interface, network interface card, network interface controller, smartNIC, router, or switch.

Some examples of network device 200 are part of an Infrastructure Processing Unit (IPU) or data processing unit (DPU). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

For example, network device 200 can utilize client intermediary 202. Some embodiments of client intermediary 202 can be configured using P4 switch-based solution (e.g., Barefoot Networks Tofino) to manage storage workloads with one or more storage clusters. Client intermediary 202 can maintain connections with the front-end clients and maintain connections to backend storage systems via gate ways. Client intermediary 202 could be configured with storage format (e.g., file, object, block) is supported by a storage cluster as well as supported protocol (e.g., Internet Small Computer Systems Interface (iSCSI), Nonvolatile Memory Express over Fabrics (NVMe-oF), key value (KV), iWARP, RoCE, or RoCEv2). For example, iSCSI is described at least in RFC 3720 (2004) and variations and revisions thereof. For example, NVMe-of is described at least in NVM Express, Inc., "NVM Express Over Fabrics," Revision 1.0, Jun. 5, 2016, and specifications referenced therein and variations and revisions thereof. Client intermediary 202 could be configured with storage format and supported protocols from a gateway service node via a communication channel with the gateway service node, orchestrator, hypervisor, or administrator.

Various modules in client intermediary 202 can be deployed in network device 200. Client intermediary 202 can perform I/O aggregation, batch handling, perform I/O merging, negotiate with the backend storage systems, and convert the storage commands from the front-end to the storage commands supported by backend storage systems. Client intermediary 202 can intercept input/output (I/O) requests received in network packets from front end storage clients A-D and perform I/O merging or batch operations based on protocols utilized by a target storage cluster. For example, in some cases, client intermediary 202 can merge storage commands from a front-end storage client and construct a new packet with other storage commands for transmission to a gate way. For example, read/write IO commands can be recognized by a header format and merged. For example, network device 200 can buffer received commands destined for gateways for clusters E and F and apply a polling policy applied to attempt to merge buffered commands by an event-driven or timer policy to balance merging commands with introducing too much delay in propagating commands to a gate way. In some cases, if a command is received and buffered and a timer expires and no command merging for a gateway can be achieved because merely one command addressed to a gateway occurs, the command can be transferred to a gateway without merging with another command.

For example, client intermediary 202 can convert storage commands received in an iSCSI communication to NVMe-oF format or merge storage commands received in iSCSI communications to an NVMe-oF format command. For example, client intermediary 202 can convert storage commands received in an NVMe-oF communication to iSCSI format or merge storage commands received in NVMe-oF communications to an iSCSI format command.

For example, client intermediary 202 can convert block based storage protocol commands (e.g., iSCSI and NVMe-oF) into an abstracted common block-based format (e.g., as abstract block I/O (ABIO)). Block storage can involve dividing data into blocks and then stores those blocks as separate pieces, with a unique identifier. For example, a block can have a unit size of 512B and logical block address 0 (LBA0) can refer to a first block, LBA1 can refer to a second block, and so forth. Client intermediary 202 can convert intermediary ABIO format commands to backend I/O command. Use of an abstracted common block-based format can assist with conversion of front-end protocols or semantics to a variety of different backend storage protocols or semantics and vice versa. Likewise, for responses received from a back-end storage system or gate way received at network device 200, client intermediary 202 can convert a backend I/O response to ABIO response format and an ABIO response format to a fronted I/O response. In some examples, client intermediary 202 can merge multiple backend I/O responses into a single front-end I/O response.

For example, for an I/O operation originated from a source IP address, client intermediary 202 can maintain a mapping table from the original command's target information to the transformed command's target information to determine how to construct a response command to a storage client. For example, if an NVMe-oF response command is 16 bytes and contains the command ID (CID), submission queue identifier (sqid), submission queue header (sqhd), client intermediary 202 can translate the response command to an ABIO format and from ABIO format to a format of the source storage client.

For front end commands such as keep alive NVMe command if the backend protocol is same as the front-end end protocol (e.g., NVMe-oF), stateless conversion can be performed. Various embodiments can store state used for mapping front-end connections and I/O requests to backend connections and backend I/O requests or mapping backend connections and backend I/O responses to front-end connections and front-end I/O responses. States can include information used to map a front end I/O command to a back-end I/O command such as LBA address mapping between the front and backend I/O commands. State information can be stored in a memory of network device 200 in a table format. For example, if a front end iSCSI command in a packet is to write I/O on a target LUN with logical block address (LBA)=A, after a command translation, back-end command can attempt to write to LBA=B on a block device in a backend storage system. After the completion, a response from the backend storage system indicating a write to LBA=B can be converted to refer to LBA=A according to the front end packet's destination address information. A front-end response to a storage client can refer to target address A.

Client intermediary 202 can perform Admin commands. For example, an Admin command can include creating a name space in the NVMe-oF protocol to translate name space creating commands. For example, a RADOS Block Device (RBD) device creation request can be issued to a backend storage system if the backend storage system is Ceph.

A storage cluster can include a cloud storage system or enterprise storage services but associated media can be local or remotely positioned with respect to the cloud storage system or enterprise storage services.

Figure 3:
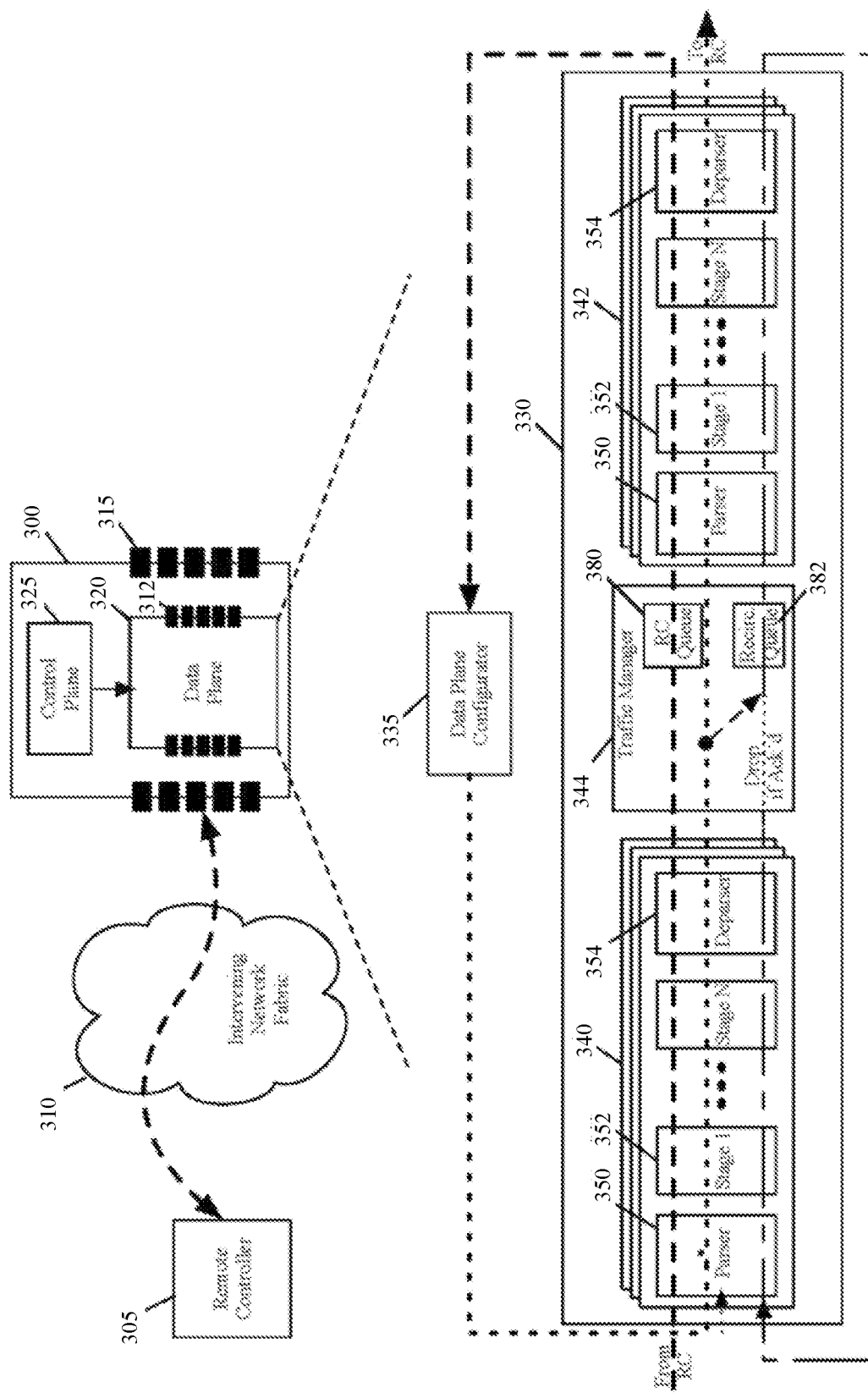
FIG. 3 depicts an example of a network device.

FIG. 3 depicts an example of a network device. Various embodiments of a network device 200 can utilize any of the technologies of the network device described with respect to FIG. 3 to merge and/or translate command formats. A network device can include a programmable packet engine pipeline 300 that includes (1) physical ports 315 that receive data messages from, and transmit data messages to, devices outside of the programmable packet engine, (2) a data-plane forwarding circuit ("data plane") 320 that perform the forwarding operations of the programmable packet engine 300 (e.g., that receive data messages and forward the data messages to other devices), and (3) a control-plane circuit ("control plane") 325 that provides a configuration interface for configuring the forwarding behavior of the data plane forwarding circuit.

As further shown, the data plane 320 includes ports 312, configurable message processing circuits 330 and a data-plane configurator 335. In some embodiments, several ports 312 receive data messages from and forward data messages to ports 315 of the programmable packet engine 300. For instance, in some embodiments, N data-plane ports 312 (e.g., 4 ports 312) are associated with each port 315 of the programmable packet engine. The N-ports 312 for each port 315 are viewed as N-channels of the port 315. In some embodiments, several data-plane ports 312 are associated with other modules (e.g., data plane configurator) of the data plane 320.

The configurable message-processing circuits 330 perform the configurable data-plane forwarding operations of the programmable packet engine to process and forward data messages to their destinations. The data-plane configurator 335 can be a processor-executed driver that configures configurable message-processing circuits 330 based on configuration data supplied by the control-plane circuit 325. The data-plane configurator 335 can also configure these circuits 330 based on configuration data messages that the data plane 320 receives in-band from the remote controller 305.

In some embodiments, the configurable message-forwarding circuits 330 of the data plane include several ingress processing pipelines 340, several egress processing pipelines 342, and a traffic management stage 344 between the ingress and egress processing pipelines 340 and 342. In some embodiments, each ingress or egress pipeline is associated with one or more physical ports 315 of the programmable packet engine 300. Also, in some embodiments, each ingress or egress pipeline is associated with several data-plane ports 312.

Also, in some embodiments, an ingress or egress pipeline includes a parser 350, several message-processing stages 352, and a deparser 354 (e.g., packet modifier). A pipeline's parser 350 extracts a message header from a data message that the pipeline receives for processing. In some embodiments, the extracted header is in a format of a header vector (HV), which can be modified by successive message processing stages as part of their message processing operations. The parser of a pipeline passes the payload of the message to the deparser 354 as the pipeline's message processing stages 352 operate on the header vectors. When a pipeline finishes processing a data message and the message has to be provided to the traffic management stage 344 (in case of an ingress pipeline) or to a port 312 to forward to a port 315 (in case of an egress pipeline) to be forwarded to the message's next hop (e.g., to its destination compute node or next forwarding element), a deparser of the pipeline in some embodiments produces the data message header from the message's header vector that was processed by the last message processing stage, and combines this header with the data message's payload.

The operations of the data plane's message processing stages are configured by a local or remote control plane using P4 or other language in some embodiments. In some embodiments, a local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server).

Control plane 325 can program one or more match action units (MAUs) of egress processing pipeline 342 to perform or implement packet modifier 210 by determining if a packet belongs to a stream and/or port and if so, performing an action of modifying a particular header field or fields of a test packet. Control plane 325 can program functions such as MAUs to perform command merging or translation from front-end to backend or backend to front-end as described herein.

Figure 4:
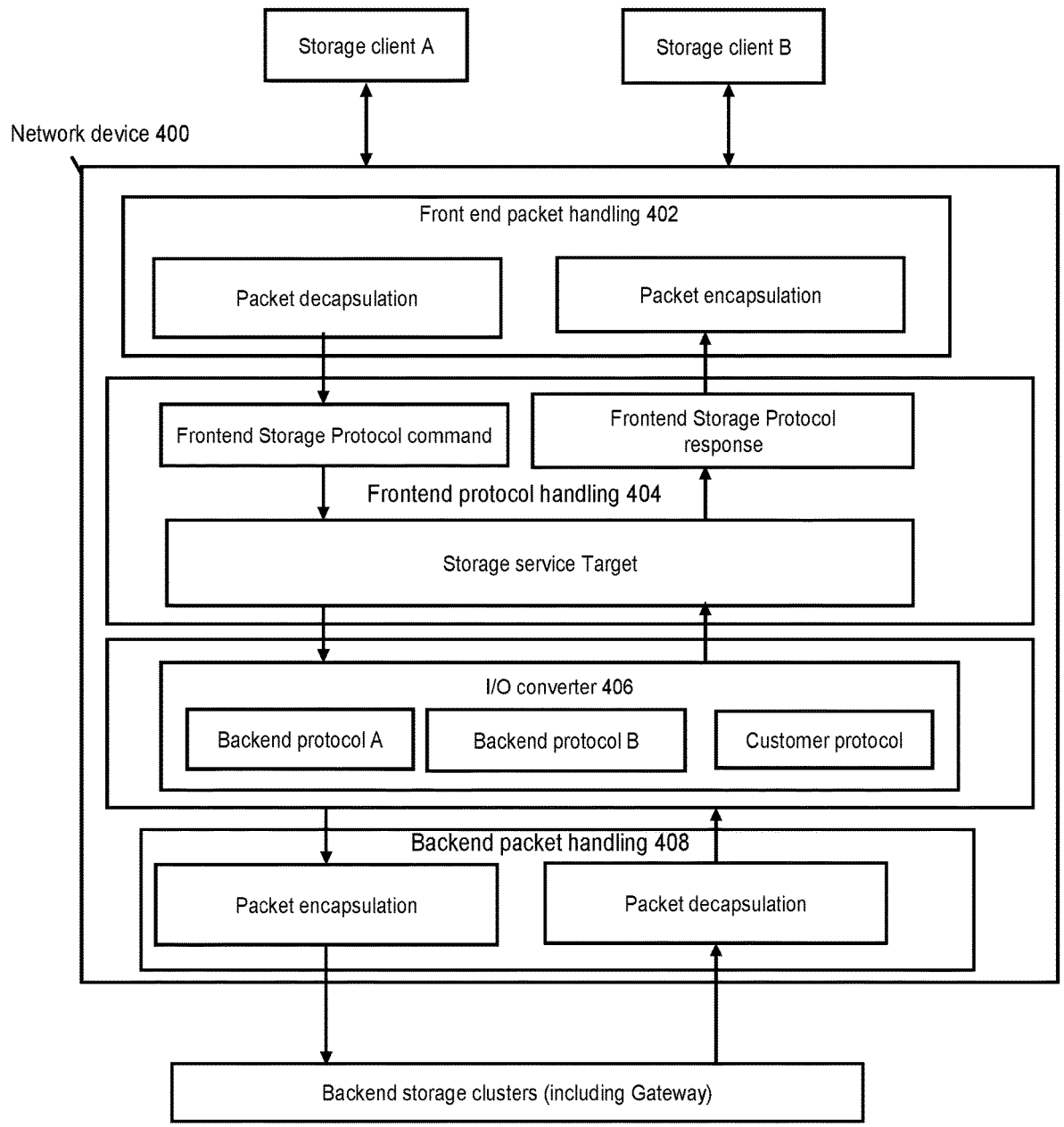
FIG. 4 shows an example of storage command processing.

FIG. 4 shows an example of storage command processing. For example, a network device and/or client intermediary can utilize and perform operations described with respect to FIG. 4. Network device 400 can receive commands from any of storage clients A or B. For example, a command can be received in a packet that is consistent with Ethernet and includes an iSCSI header or NVMe-oF header that refers to a read or write command and data. Front-end packet handling 402 can decapsulate/encapsulate the packets from/to the front-end applications. For received packets from a storage client, front end packet handling 402 can perform packet decapsulation to decapsulate received packets and provide a read or write command and data for subsequent processing.

Front-end protocol handling 404 can perform I/O aggregation, batching, or I/O merging. For example, multiple iSCSI services (front end) can be mapped to fewer NVMe-oF connections (back-end) or NVMe-oF connections (front end) can be mapped to fewer iSCSI services (back-end). For example, commands can be merged whereby block-based read/write commands can be combined. Front-end protocol handling 404 can negotiate with backend storage systems to conduct I/O operations with a back-end storage cluster.

If the backend and the front-end protocols are the same, no conversion may occur but a consolidation or merging of commands can occur. For example, if NVMe-oF is used by front-end clients and backend storage clusters, front-end protocol handling 404 could be forward the command without translation. Front-end protocol handling 404 can provide a storage service target that can translate storage commands (e.g., block based commands) from storage clients or front-end users into an abstracted block based storage commands (e.g., BIO in Linux kernel). For a response from a backend storage system, storage service target of front-end protocol handling 404 can translate the received response to an abstracted block based storage command and translate the abstracted block based storage command to a formats used in a request by a front end user storage client.

I/O converter 406 can convert abstracted block based storage commands received from front-end protocol handling 404 to a format of storage commands which can be recognized by the backend storage systems. I/O converter 406 can convert storage commands received from back-end storage clusters to abstracted block based storage commands for processing by front-end protocol handling 404. If front-end and backend use different storage semantics, some I/O transforming efforts can be performed. For example, if the front-end utilizes iSCSI commands, but the backend is used to connect the Ceph object storage daemons (OSDs) directly, then the iSCSI commands could be transformed into Ceph RADOS Block Device (RBD) based requests.

Backend packet handling 408 can encapsulate commands and/or data into packets for transmission to the backend storage systems or decapsulate packets from backend storage systems to provide commands and/or data.

Figure 5A:
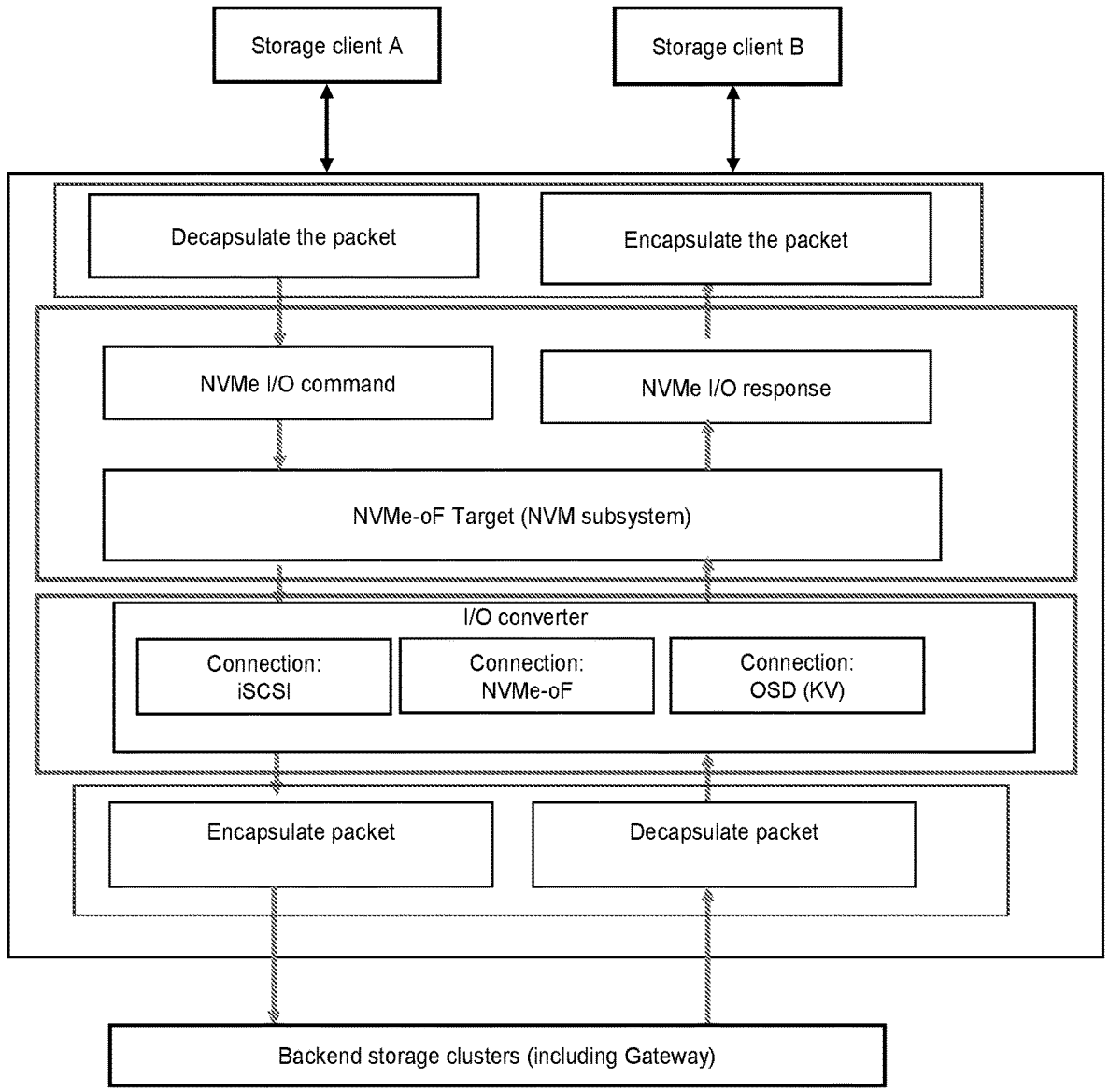
FIG. 5A shows an example of protocol conversions for front end NVMe-oF communications.

FIG. 5A shows an example of protocol conversions for front end NVMe-oF communications. NVMe-oF defines a common architecture that supports a range of storage networking fabrics for NVMe block storage protocol over a storage networking fabric. NVMe-oF enables a front-side interface into storage systems, scaling out to large numbers of NVMe devices and extending the distance within a datacenter over which NVMe devices and NVMe subsystems can be accessed. In the example of FIG. 5A, the front-end application utilizes an NVMe-oF target service and the backend storage system is Ceph or iSCSI. In this case, I/O converter translates NVMe-oF commands into Ceph or iSCSI.

The following is an example of a write operation using NVMe-oF TCP transport from the clients to the backend storage systems. At (1) a data packet is received at a network element and the network element has a source IP address of 192.168.0.3. At (2), a front-end packet handling module extracts the NVMe command (write command) in the packet and marks which connection it belongs to. At (3), the command is provided to a customized storage service NVMe-of target. At (4), the NVMe write command is transformed into an RBD write request by an I/O converter because the backend storage system is Ceph according to the NVMe subsystem configuration in NVMe-oF target. I/O converter may merge the front-end storage I/O commands in order to send them in a batched manner to the backend storage systems. At (5), converted command(s) is/are encapsulated in one or more packets. At (6), when the commands issued to the Ceph cluster is completed, the backend packet handling module can decapsulate the packets and extract the response command. At (7), the response command can be converted by I/O converter to NVMe-oF and passed to an NVMe-oF target in the network device. At (8), the NVMe-oF target obtains the command and changes NVMe-oF target status if needed. At (9), the NVMe-oF target delivers the NVMe I/O response into NVMe-oF TCP packet for transmission to a front-end application using a previous marked connection between the front-end application and the network element that is an intermediary between a client application and storage cluster gateway.

Figure 5B:
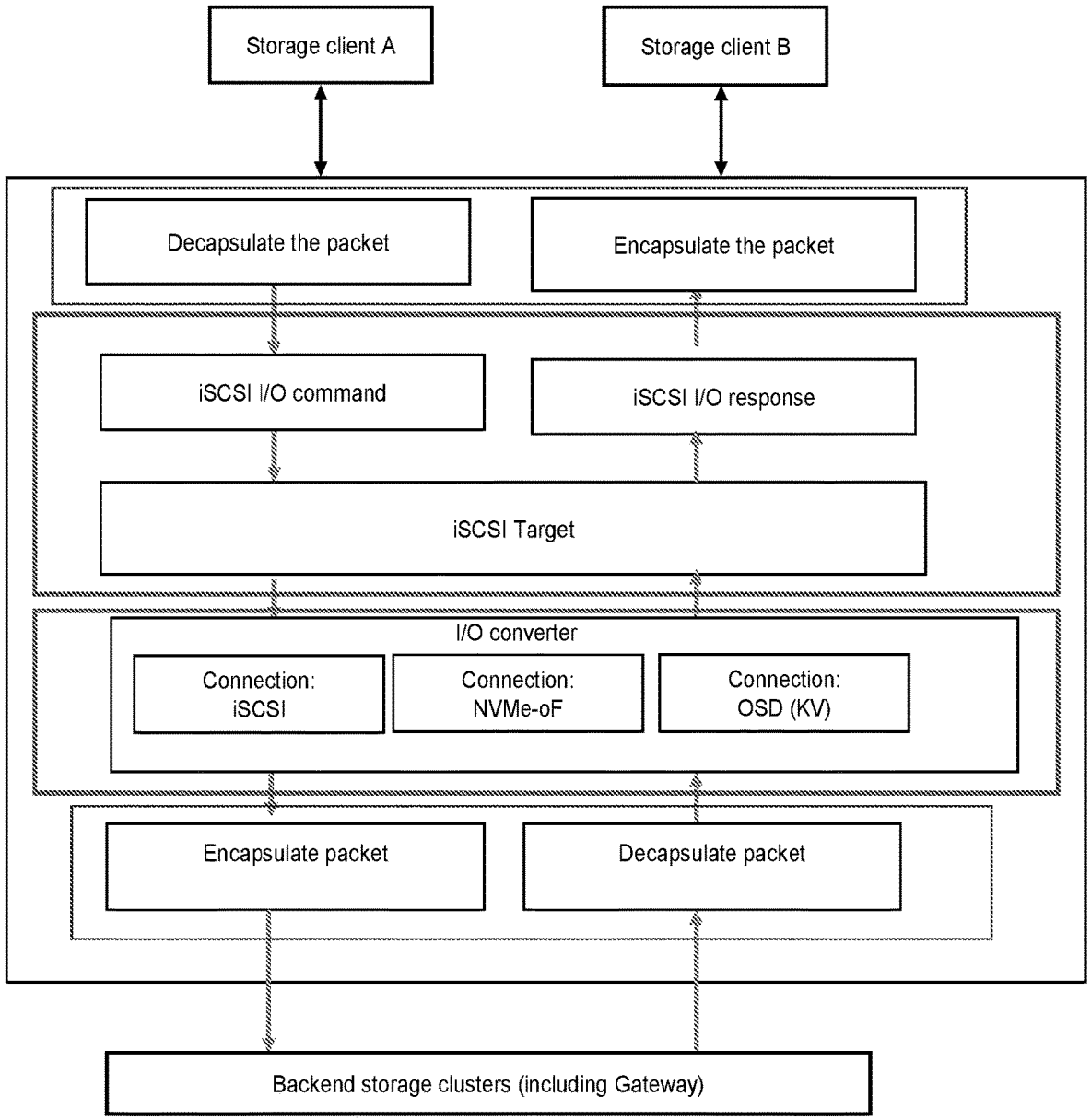
FIG. 5B shows an example of protocol conversions for a front end iSCSI communications service.

FIG. 5B shows an example of protocol conversions for a front end iSCSI communications service. Similar operations can take place in the system of FIG. 5B to perform command format translation for a front end iSCSI communication to a back-end NVMe-oF or Ceph command, or others.

Figure 6A:
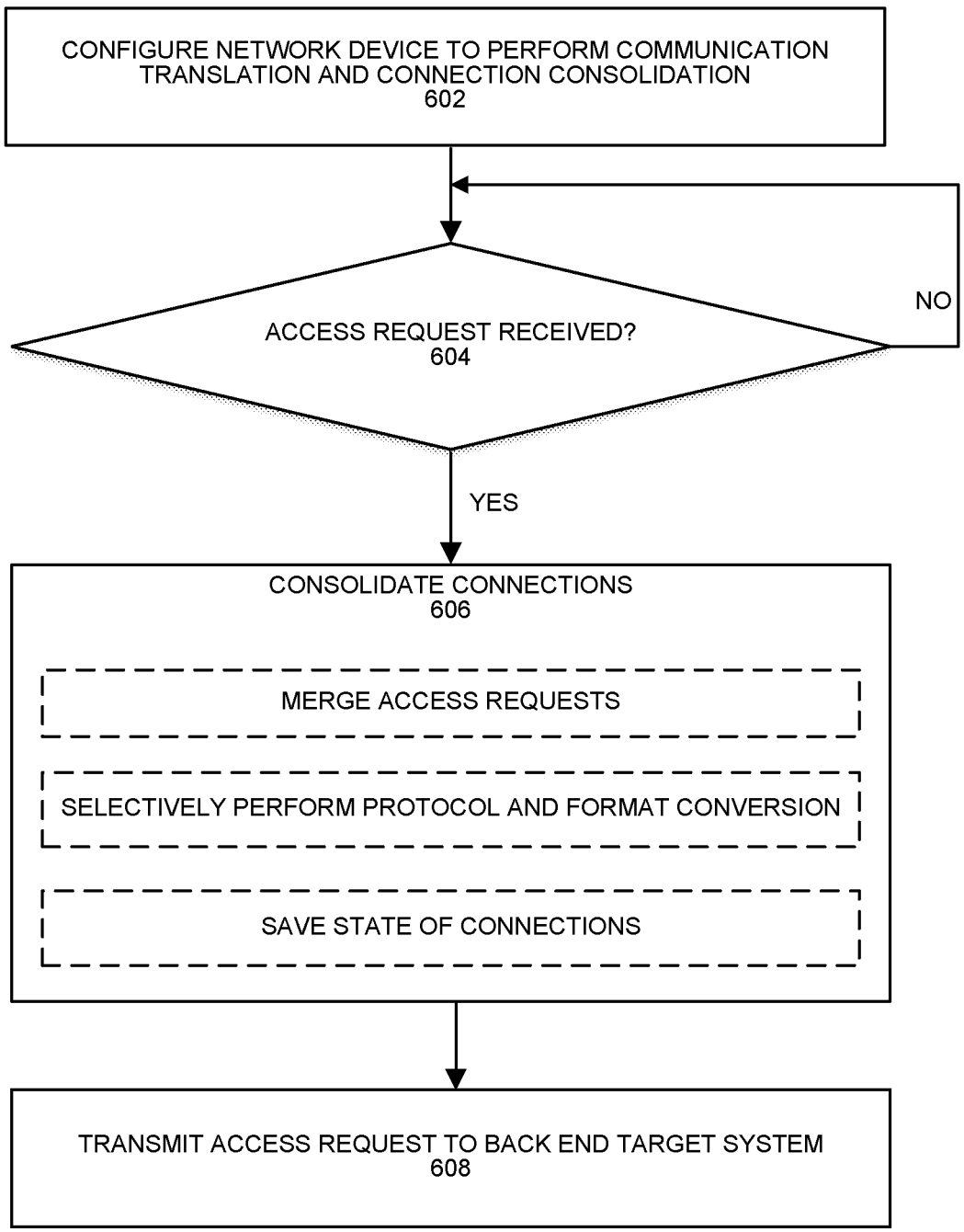
FIG. 6A depicts an example process.

FIG. 6A depicts an example process. The process can be performed by a network device including a switch, router, smartNIC, network interface controller, endpoint transmitter, or endpoint receiver. At 602, a network device can be configured to perform storage communication translation and connection consolidation between front end client devices and back-end storage services, gateways, or clusters. The network device can include a programmable data plane or offload engine to perform client-to-storage cluster intermediary operations. To configure the network data plane, the data plane can be programmable using P4, C, Broadcom Inc. Network Programming Language (NPL), or x86 compatible executable binaries or other executable binaries.

At 604, the network device can determine if an access request is received. If an access request is received, the process can continue to 606. If an access request is not received, the process can repeat 604. The access request can be received using a connection formed between a front end client and a storage system. A memory access request can include a read command or write command with data and can refer to any address in volatile or non-volatile memory or a storage medium.

At 606, the network device can attempt to consolidate memory access requests to a fewer number of connections than between the front end client and the network device. For example, if two connections from different hosts access two different logical unit numbers (LUNs) in the storage service and if the two LUNs can be mapped to the same block device in the backend storage system but with different ranges, the network device can use one connection to connect to the backend storage systems. Consolidating the memory access requests can include combining read commands with other read commands among front end connections with front end clients or combining write commands with other write commands among connections among front end connections with front end clients. In some cases, if a front end and back-end utilize the same protocol, protocol conversion may not be utilized. In cases where a front end and back-end utilize different protocols, protocol conversion can occur from a format of a connection from the front end client to a second format accepted by the back-end storage system. Examples of supported formats can include iSCSI services, NVMe-oF subsystems, Key-Value (KV) stores, iWARP, iSCSI, RDMA, any custom protocol.

The network device can save connection state for use in managing responses to a request sent to a backend storage system. State can include original IP address and port and the original active commands on this connection.

At 608, the network device can transmit one or more packets to the band end storage system that is the target of the access request. The one or more packets can be transmitted using a connection between the network device and the back-end storage system.

Figure 6B:
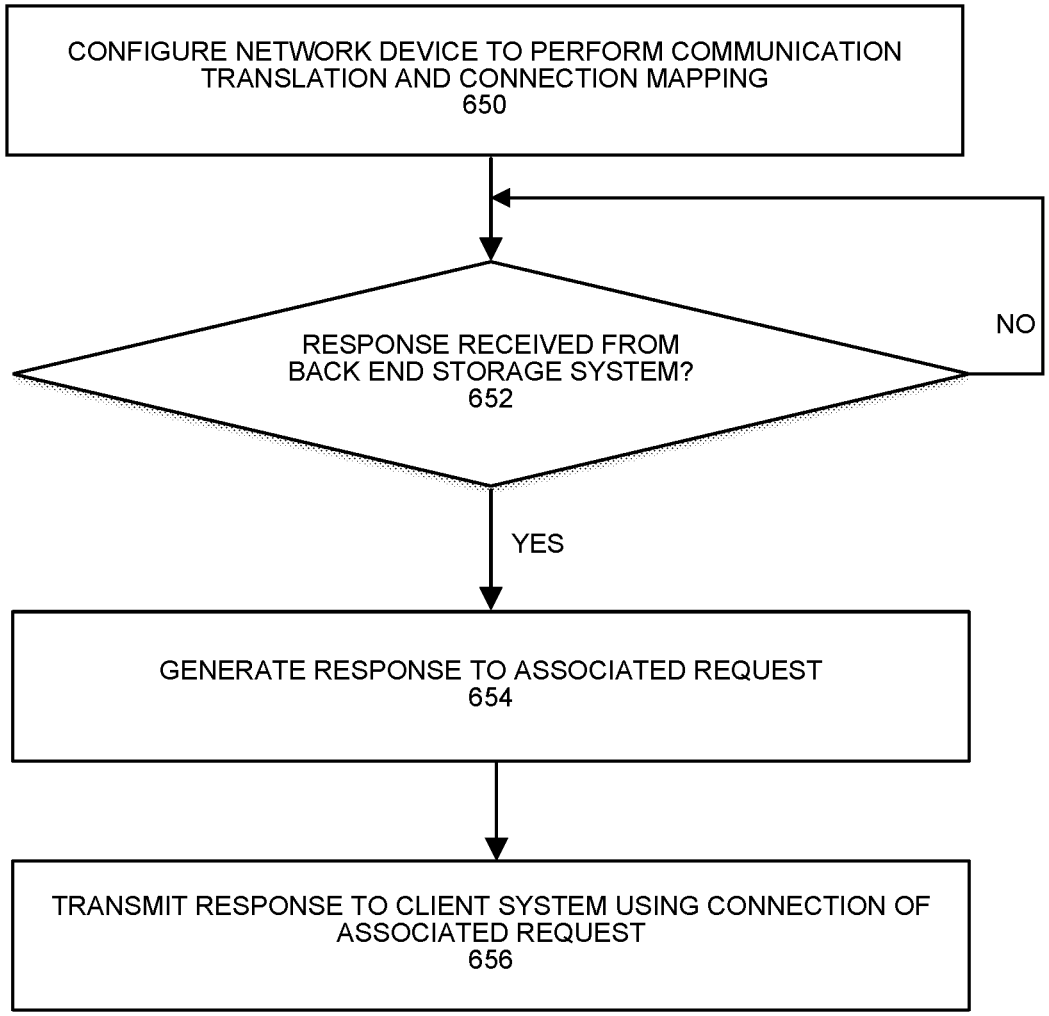
FIG. 6B depicts an example process.

FIG. 6B depicts an example process. The process can be performed by a network device including a switch, router, smartNIC, network interface controller, endpoint transmitter, or endpoint receiver. At 650, a network device can be configured to perform storage communication translation between back-end storage services, gateways, or clusters and front end client devices. The network device can include a programmable data plane. To configure the network data plane, the data plane can be programmable using P4 or C. In some examples, the switch can offload some command header parsing work or memory copy work to an offload engine.

At 652, the network device can determine if a response is received from a storage system. If a response was received, the process can continue to 654. If a response was not received the process can repeat 652. At 654, the network device can generate a response to an associated request. If the response format is different than a format of the associated request, the network device can selectively convert the response to a format consistent with a format of a received memory access request among the received memory access requests. If the response format is a same as a format of the associated request, the network device can transfer indicators in the response for transmission to the client. State of a connection utilized by a the request to which the response is provided can be used to form a response. At 656, the network device can transmit the response in a packet using a particular connection on which a corresponding request was received.

Figure 7:
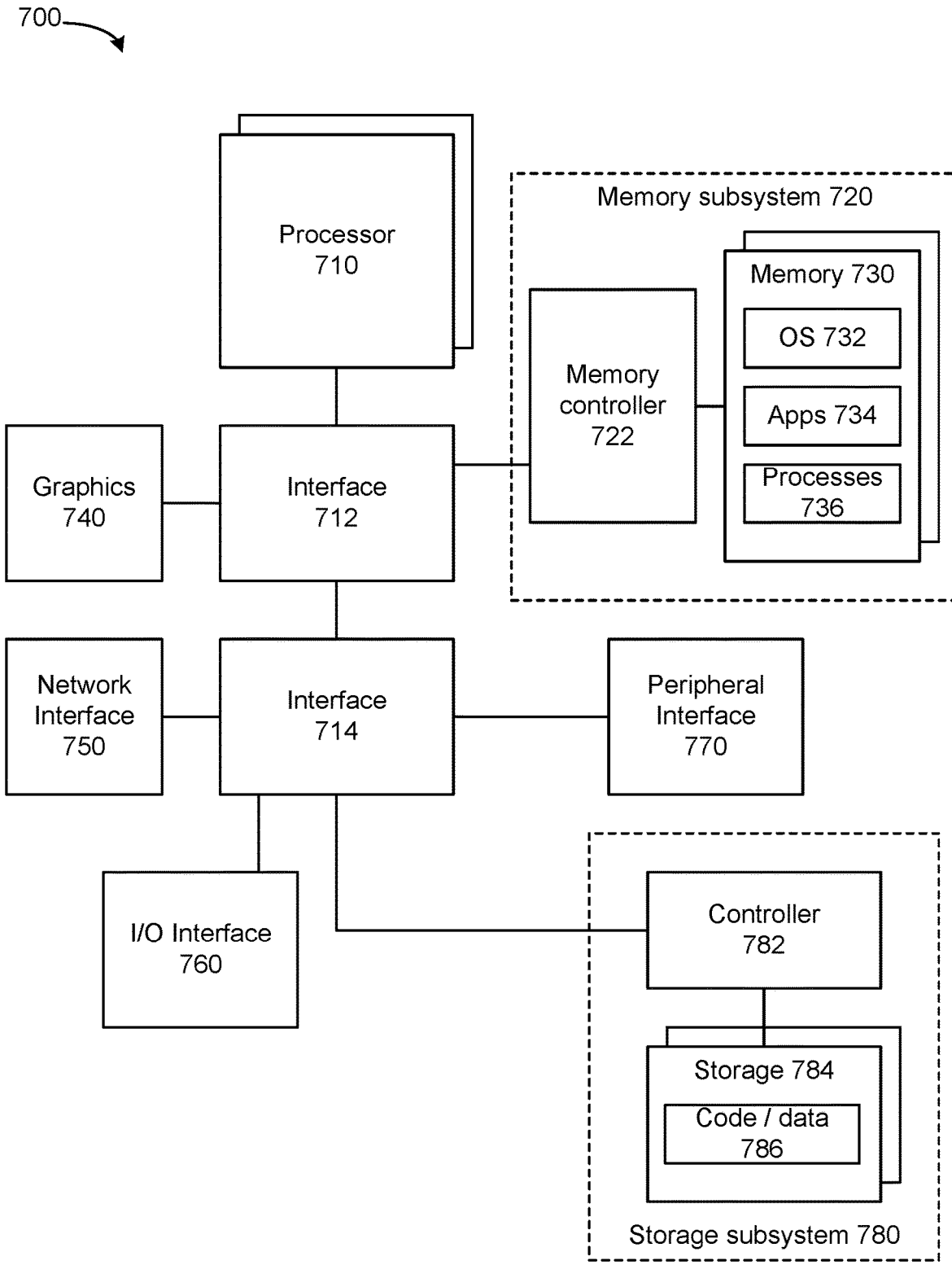
FIG. 7 depicts a system.

FIG. 7 depicts a system. Various embodiments can be used by system 700 to transmit and receive requests from a storage system based on embodiments described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/ authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can determine a capability of a device associated with a device driver. For example, OS 732 can receive an indication of a capability of a device (e.g., NIC 750) to configure a NIC 750 to perform any of the capabilities described herein (e.g., NIC 750 consolidating access requests and reducing connections with a back-end storage system). OS 732 can request a driver to enable or disable NIC 750 to perform any of the capabilities described herein. In some examples, OS 732, itself, can enable or disable NIC 750 to perform any of the capabilities described herein. OS 732 can provide requests (e.g., from an application or virtual machine) to NIC 750 to utilize one or more capabilities of NIC 750. For example, any application can request use or non-use of any of capabilities described herein by NIC 750.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. Various embodiments of network interface 750 use embodiments described herein to receive or transmit timing related signals and provide protection against circuit damage from misconfigured port use while providing acceptable propagation delay.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Figure 8:
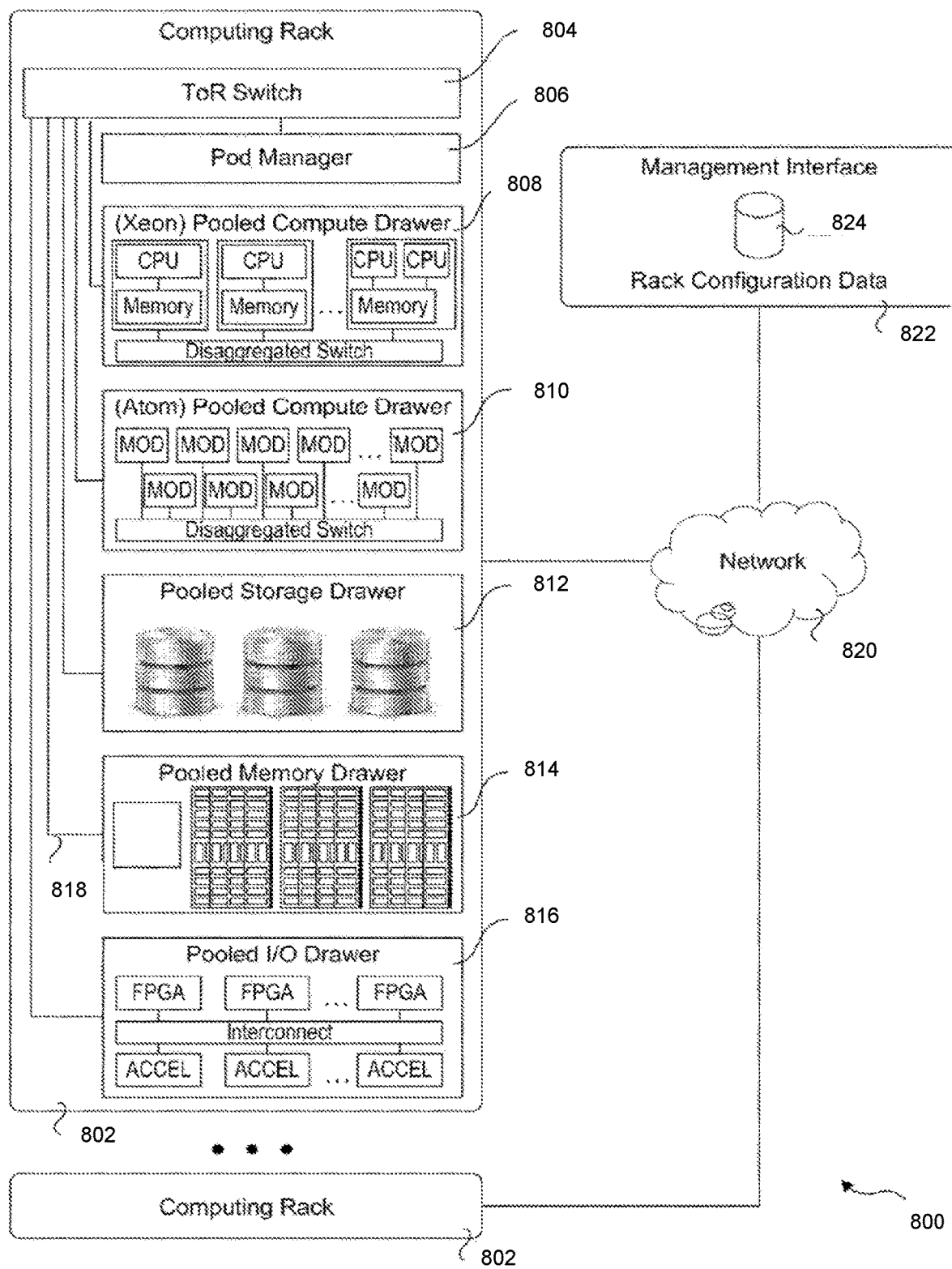
FIG. 8 depicts an example environment.

FIG. 8 depicts an environment 800 includes multiple computing racks 802, each including a Top of Rack (ToR) switch 804, a pod manager 806, and a plurality of pooled system drawers. Various embodiments can be used by environment 800 to reduce connections or consolidate commands based on embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 808, and Intel® ATOM™ processor pooled compute drawer 810, a pooled storage drawer 812, a pooled memory drawer 814, and a pooled I/O drawer 816. Each of the pooled system drawers is connected to ToR switch 804 via a high-speed link 818, such as an Ethernet link or Silicon Photonics (SiPh) optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824. In an example, environment 800 can be implemented using interconnected compute sleds of processors, memories, storages, network interfaces, and other components.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes an apparatus comprising: a network device, when operational, to: receive memory access requests in a first number of connections from one or more front-end clients destined to a storage system and consolidate the memory access requests to a second number of connections between the network device and the storage system, wherein the second number is less than the first number.

Example 2 includes any example, wherein to consolidate the memory access requests to a second number of connections between the network device and the storage system, the network device, when operational, is to: combine read commands with other read commands destined to the storage system and combine write commands with other write commands destined to the storage system.

Example 3 includes any example, wherein to consolidate the memory access requests to a second number of connections between the network device and the storage system, the network device, when operational, is to: perform protocol conversion to a format accepted by a target storage system.

Example 4 includes any example, wherein the network device, when operational, is to: provide a storage interface to a front-end client for the first number of connections and provide a front-end client interface to the storage system for the second number of connections.

Example 5 includes any example, wherein to consolidate the memory access requests to a second number of connections between the network device and the storage system, the network device, when operational, is to: store a state of a received command from at least one of the one or more front-end clients for formation of a response to at least one of the one or more front-end clients.

Example 6 includes any example, wherein the network device, when operational, is to: receive a response to a memory access request from the storage system; selectively convert the response to a format consistent with a format of a received memory access request among the received memory access requests; transmit the response in at least one packet using a particular connection among the first number of connections, wherein the connection among the first number of connections is associated with the memory access request to which the response is received.

Example 7 includes any example, wherein the format comprises one or more of: Internet Small Computer Systems Interface (iSCSI), Nonvolatile Memory Express over Fabrics (NVMe-oF), or a key value (KV) format.

Example 8 includes any example, wherein the network device comprises one or more of: a switch, router, endpoint transmitter, or endpoint receiver.

Example 9 includes any example, wherein the network device comprises a P4 or C language programmable packet processing pipeline.

Example 10 includes any example, and includes a method comprising: receiving memory access requests in a first number of connections from one or more front-end clients destined to a storage system and consolidating the memory access requests to a second number of connections between a network device and the storage system, wherein the second number is less than the first number.

Example 11 includes any example, wherein consolidating the memory access requests to a second number of connections between a network device and the storage system comprises: combining read commands with other read commands destined to the storage system among connections of the first number of connections and combining write commands with other write commands destined to a same storage system among connections of the first number of connections.

Example 12 includes any example, wherein consolidating the memory access requests to a second number of connections between a network device and the storage system comprises: performing protocol conversion to a format accepted by the storage system.

Example 13 includes any example, and includes identifying read or write commands based on content of a header of a received packet, wherein the received packet includes a read or write command.

Example 14 includes any example, wherein consolidating the memory access requests to a second number of connections between a network device and the storage system comprises: storing a state of a received command from at least one of the one or more front-end clients for formation of a response to at least one of the one or more front-end clients.

Example 15 includes any example, and includes receiving a response to a memory access request from the storage system; selectively converting the response to a format consistent with a format of a received memory access request among the received memory access requests; and transmitting the response in at least one packet using a particular connection among the first number of connections, wherein the connection among the first number of connections is associated with the memory access request to which the response is received.

Example 16 includes any example, wherein the format comprises one or more of: Internet Small Computer Systems Interface (iSCSI), Nonvolatile Memory Express over Fabrics (NVMe-oF), or a key value (KV) format.

Example 17 includes any example, and includes configuring a network device to perform the consolidating using a P4 or C language configuration.

Example 18 includes any example, and includes a computer-readable medium comprising instructions stored thereon, that if executed by a data plane of a network device, cause the data plane to: combine memory access requests received on a first number of connections destined for a storage system to a second number of connections between a network device and the storage system, wherein the second number is less than the first number.

Example 19 includes any example, wherein to combine memory access requests received on a first number of connections destined for a storage system to a second number of connections between a network device and the storage system, wherein the second number is less than the first number, the data plane is to: combine read commands with other read commands received among connections of the first number of connections and combine write commands with other write commands received among connections of the first number of connections.

Example 20 includes any example, and includes instructions stored thereon, that if executed by a data plane of a network device, cause the data plane to: provide a storage interface to a front-end client for the first number of connections and provide a front-end client interface to the storage system for the second number of connections.

What is claimed is:

1. An apparatus comprising:
  a network device, when operational, to:
    receive memory access requests in a first number of connections from one or more front-end clients destined to a storage system, wherein:
      each of the first number of connections is from a different respective front-end client and accesses a different respective logical unit number (LUN) in the storage system, and
      each respective LUN can be mapped to a same block device in the storage system but with a different respective range; and
    consolidate, using a programmable packet processing pipeline of the network device, the memory access requests to a second number of connections between the network device and the storage system, wherein the second number is less than the first number, the programmable packet processing pipeline to programmably merge and/or translate the memory access requests, wherein:
      the programmable packet processing pipeline comprises at least one match action unit to be programmed, by a remote control plane, to perform programmable merging and/or programmable translation of the memory access requests, and
      the remote control plane is to be implemented, at least in part, by a remote forwarding element and/or a remote server.

2. The apparatus of claim 1, wherein to consolidate the memory access requests to a second number of connections between the network device and the storage system, the network device, when operational, is to:
  combine read commands with other read commands destined to the storage system; and
  combine write commands with other write commands destined to the storage system.

3. The apparatus of claim 2, wherein to consolidate the memory access requests to a second number of connections between the network device and the storage system, the network device, when operational, is to:
  perform protocol conversion to a format accepted by a target storage system.

4. The apparatus of claim 1, wherein the network device, when operational, is to:
  provide a storage interface to a front-end client for the first number of connections; and
  provide a front-end client interface to the storage system for the second number of connections.

5. The apparatus of claim 1, wherein to consolidate the memory access requests to a second number of connections between the network device and the storage system, the network device, when operational, is to:
  store a state of a received command from at least one of the one or more front-end clients for formation of a response to at least one of the one or more front-end clients.

6. The apparatus of claim 1, wherein the network device, when operational, is to:
  receive a response to a memory access request from the storage system;
  selectively convert the response to a format consistent with a format of a received memory access request among the received memory access requests; and
  transmit the response in at least one packet using a particular connection among the first number of connections, wherein the connection among the first number of connections is associated with the memory access request to which the response is received.

7. The apparatus of claim 6, wherein the format comprises one or more of:
  Internet Small Computer Systems Interface (iSCSI), Non-volatile Memory Express over Fabrics (NVMe-oF), or a key value (KV) format.

8. The apparatus of claim 1, wherein the network device comprises one or more of: a switch, router, endpoint transmitter, or endpoint receiver.

9. The apparatus of claim 1, wherein the network device comprises a P4 or C language programmable packet processing pipeline.

10. A method comprising:
  receiving memory access requests in a first number of connections from one or more front-end clients destined to a storage system, wherein:
    each of the first number of connections is from a different respective front-end client and accesses a different respective logical unit number (LUN) in the storage system, and
    each respective LUN can be mapped to a same block device in the storage system but with a different respective range; and
  consolidating, using a programmable packet processing pipeline of a network device, the memory access requests to a second number of connections between the network device and the storage system, wherein the second number is less than the first number, the programmable packet processing pipeline to programmably merge and/or translate the memory access requests, wherein:
    the programmable packet processing pipeline comprises at least one match action unit to be programmed, by a remote control plane, to perform programmable merging and/or programmable translation of the memory access requests, and
    the remote control plane is to be implemented, at least in part, by a remote forwarding element and/or a remote server.

11. The method of claim 10, wherein consolidating the memory access requests to a second number of connections between the network device and the storage system comprises:
  combining read commands with other read commands destined to the storage system among connections of the first number of connections; and
  combining write commands with other write commands destined to a same storage system among connections of the first number of connections.

12. The method of claim 10, wherein consolidating the memory access requests to a second number of connections between the network device and the storage system comprises:
  performing protocol conversion to a format accepted by the storage system.

13. The method of claim 10, comprising:
  identifying read or write commands based on content of a header of a received packet, wherein the received packet includes a read or write command.

14. The method of claim 10, wherein consolidating the memory access requests to a second number of connections between the network device and the storage system comprises:
  storing a state of a received command from at least one of the one or more front-end clients for formation of a response to at least one of the one or more front-end clients.

15. The method of claim 10, comprising:
  receiving a response to a memory access request from the storage system;
  selectively converting the response to a format consistent with a format of a received memory access request among the received memory access requests; and
  transmitting the response in at least one packet using a particular connection among the first number of connections, wherein the connection among the first number of connections is associated with the memory access request to which the response is received.

16. The method of claim 15, wherein the format comprises one or more of:
  Internet Small Computer Systems Interface (iSCSI), Non-volatile Memory Express over Fabrics (NVMe-oF), or a key value (KV) format.

17. The method of claim 10, comprising:
  configuring the network device to perform the consolidating using a P4 or C language configuration.

18. A non-transitory computer-readable storage medium comprising instructions stored thereon, that if executed by a data plane of a network device, cause the data plane to perform operations comprising:
  combine, using a programmable packet processing pipeline of the network device, memory access requests received on a first number of connections destined for a storage system to a second number of connections between the network device and the storage system, wherein;
    each of the first number of connections is from a different respective front-end client and accesses a different respective logical unit number (LUN) in the storage system,
    each respective LUN can be mapped to a same block device in the storage system but with a different respective range, the second number is less than the first number, the programmable packet processing pipeline to programmably merge and/or translate the memory access requests, the programmable packet processing pipeline comprises at least one match action unit to be programmed, by a remote control plane, to perform programmable merging and/or programmable translation of the memory access requests, and the remote control plane is to be implemented, at least in part, by a remote forwarding element and/or a remote server.

19. The non-transitory computer-readable storage medium of claim 18, wherein to combine memory access requests received on a first number of connections destined for a storage system to a second number of connections between the network device and the storage system, wherein the second number is less than the first number, the data plane is to:

combine read commands with other read commands received among connections of the first number of connections; and combine write commands with other write commands received among connections of the first number of connections.

20. The non-transitory computer-readable storage medium of claim 18, wherein the operations also comprise:

provide a storage interface to a front-end client for the first number of connections; and provide a front-end client interface to the storage system for the second number of connections.

\* \* \* \* \*